United States Patent
Zhao et al.

(10) Patent No.: US 11,359,610 B2
(45) Date of Patent: Jun. 14, 2022

(54) ASSEMBLY STRUCTURE OF SUN GEAR SHAFT AND SPLINE SHAFT OF A GEARBOX FOR WIND TURBINE

(71) Applicant: NANJING HIGH-SPEED GEAR MANUFACTURING CO., LTD., Jiangsu (CN)

(72) Inventors: Yawen Zhao, Jiangsu (CN); Aimin He, Jiangsu (CN); Yizhong Sun, Jiangsu (CN); Rongjun Chen, Jiangsu (CN); Qiang Chen, Jiangsu (CN)

(73) Assignee: NANJING HIGH-SPEED GEAR MANUFACTURING CO., LTD., Jiangsu (CN)

( * ) Notice: Subject to any disclaimer, the term of this patent is extended or adjusted under 35 U.S.C. 154(b) by 36 days.

(21) Appl. No.: 17/075,683

(22) Filed: Oct. 20, 2020

(65) Prior Publication Data
US 2021/0131402 A1    May 6, 2021

(30) Foreign Application Priority Data
Nov. 6, 2019    (CN) .......................... 201911076451.2

(51) Int. Cl.
*F03D 15/10*    (2016.01)
*F03D 80/70*    (2016.01)

(52) U.S. Cl.
CPC ............. *F03D 15/10* (2016.05); *F03D 80/70* (2016.05); *F05B 2240/61* (2013.01); *F05B 2260/301* (2013.01); *F05B 2260/40311* (2013.01); *F05B 2260/98* (2013.01)

(58) Field of Classification Search
CPC ...... F03D 15/10; F03D 80/70; F05B 2240/61; F05B 2260/301
See application file for complete search history.

(56) References Cited

FOREIGN PATENT DOCUMENTS

| CN | 202040282 | 11/2011 |
|---|---|---|
| CN | 202082369 | 12/2011 |
| CN | 203297581 | 11/2013 |

(Continued)

OTHER PUBLICATIONS

Extended European Search Report for 20205776.6 (dated May 14, 2021) (8 pages).

(Continued)

*Primary Examiner* — Sean Gugger

(57) ABSTRACT

Provided is an assembly structure of sun gear shaft and spline shaft of a gearbox for wind turbine. The assembly structure relates to the technical field of gearboxes for wind turbine and includes a sun gear shaft, a spline shaft, a mechanical pump drive gear, and a distance ring. The spline shaft is a hollow shaft. One end of the sun gear shaft is inserted into the spline shaft. The one end of the sun gear shaft inserted into the spline shaft is connected to the spline shaft through a spline pair. The mechanical pump drive gear is mounted at one end of the spline shaft. The inner diameter of the mechanical pump drive gear is less than the inner diameter of the spline shaft. The distance ring is disposed in the spline shaft. One end of the distance ring abuts against the inner side of the mechanical pump drive gear and is securely connected to the mechanical pump drive gear. Another end of the distance ring is spaced from the one end of the sun gear shaft in the spline shaft.

8 Claims, 2 Drawing Sheets

(56) References Cited

FOREIGN PATENT DOCUMENTS

| | | |
|---|---|---|
| CN | 104930173 | 9/2015 |
| CN | 104930173 A1 * | 9/2015 |
| CN | 205298474 | 6/2016 |
| CN | 109899503 | 6/2019 |
| CN | 109899503 A1 * | 6/2019 |
| CN | 110671485 | 1/2020 |
| CN | 210889998 | 6/2020 |
| JP | 2003269553 | 9/2003 |

OTHER PUBLICATIONS

English Translation of ISR for PCT/CN2020/120118 (dated Jan. 13, 2021) (7 pages).

* cited by examiner

ASSEMBLY STRUCTURE OF SUN GEAR SHAFT AND SPLINE SHAFT OF A GEARBOX FOR WIND TURBINE

CROSS-REFERENCE TO RELATED APPLICATION(S)

This application claims priority to Chinese patent application No. 201911076451.2 filed on Nov. 6, 2019, the disclosure of which is incorporated herein by reference in its entirety.

TECHNICAL FIELD

The present disclosure relates to the technical field of gearboxes for wind turbine and, in particular, to an assembly structure of sun gear shaft and spline shaft of a gearbox for wind turbine.

BACKGROUND

Compared with thermal power generation and hydropower generation, wind power generation has great advantages. The vigorous development of wind power generation is of great significance to the country's economic construction and environmental protection. In a wind turbine, the gearbox is a key component of the wind turbine. The gearbox in the wind turbine has the characteristics of large transmission load and long working duration. Once a failure occurs, the maintenance cost is extremely high.

The gearbox in a medium- or large-megawatt wind turbine is generally a structure that uses planetary transmission and parallel transmission. Parallel transmission means that the sun gear shaft is connected to the spline shaft through splines, and the spline shaft and the sun gear shaft are disposed in parallel to achieve torque transmission. Generally, the planetary sun gear shaft and the planetary gear mesh through helical teeth to bear a greater load. However, in this manner, the sun gear shaft generates a larger axial force to cause the sun gear shaft and the spline shaft to wear more. In addition, the sun gear shaft is generally of floating design to balance the load transmitted by multiple planetary gears. Therefore, there is a micro-motion between the sun gear shaft and the spline shaft during operation, also causing wear between the sun gear shaft and the spline shaft. If wear between the sun gear shaft and the spline shaft continues to develop, the sun gear shaft is axially misaligned. As a result, axial deviation occurs in meshing of the tooth surface of the sun gear shaft and causes the gearbox to be completely damaged.

Therefore, the related art needs to be improved and developed.

SUMMARY

The object of the present disclosure is to provide an assembly structure of sun gear shaft and the spline shaft of a gearbox for wind turbine to solve the problem in which the excessive axial force of the sun gear shaft of a gearbox for wind turbine in the related art causes wear between the sun gear shaft and the spline shaft to speed up and thus leads to damage of the gearbox.

To achieve this object, the present disclosure adopts the technical solutions below.

An assembly structure of sun gear shaft and spline shaft of a gearbox for wind turbine includes a sun gear shaft, a spline shaft, a mechanical pump drive gear, and a distance ring.

The spline shaft is a hollow shaft, one end of the sun gear shaft is inserted into the spline shaft, and the one end of the sun gear shaft inserted into the spline shaft is connected to the spline shaft through a spline pair.

The mechanical pump drive gear is mounted at one end of the spline shaft. The inner diameter of the mechanical pump drive gear is less than the inner diameter of the spline shaft.

The distance ring is disposed in the spline shaft. One end of the distance ring abuts against the inner side of the mechanical pump drive gear and is securely connected to the mechanical pump drive gear. Another end of the distance ring is spaced from the one end of the sun gear shaft in the spline shaft.

Optionally, the distance ring includes a distance ring side wall parallel to the spline shaft and a distance ring bottom perpendicular to the spline shaft. The distance ring side wall abuts against the inner side of the mechanical pump drive gear and is securely connected to the mechanical pump drive gear. The distance ring bottom is spaced from the end of the sun gear shaft in the spline shaft.

Optionally, a first bolt holes is disposed at an end of the distance ring side wall connected to the mechanical pump drive gear. The first bolt holes are disposed along the axial direction of the distance ring. The mechanical pump drive gear is provided with a second bolt hole corresponding to the first bolt holes. A first bolt is inserted into the second bolt hole and the first bolt holes so that the distance ring can be secured to the mechanical pump drive gear.

Optionally, a gap is disposed between an outer surface of the distance ring and an inner wall of the spline shaft. A first oil drain hole is disposed at a position on the mechanical pump drive gear that corresponds to the gap.

Optionally, a shoulder is disposed in the spline shaft. A step surface matched with the shoulder is disposed on the sun gear shaft. The shoulder abuts against the step surface to make the sun gear shaft axially positioned.

Optionally, the shoulder is located between the spline pair and the distance ring. A second oil drain hole is disposed on the shoulder. The second oil drain hole is disposed along the axial direction of the spline shaft.

Optionally, the assembly structure further includes a tube shaft. The sun gear shaft is a hollow shaft. The tube shaft is inserted into the shaft hole of the sun gear shaft.

Optionally, an inner diameter of the distance ring is greater than an outer diameter of the tube shaft.

Optionally, the assembly structure further includes a first gear, an output shaft and a mechanical pump. The first gear is meshed with the mechanical pump drive gear. One end of the output shaft is connected to the first gear, and another end of the output shaft is connected to the mechanical pump.

Optionally, the assembly structure further includes a second bolt. The mechanical pump drive gear is mounted on the spline shaft through the second bolt.

The beneficial effects of the present disclosure are described below.

In the present disclosure, a distance ring is disposed in the assembly structure of sun gear shaft and spline shaft of a gearbox for wind turbine. One end of the distance ring is adjacent to the sun gear shaft. When axially deviating under the action of the axial force, the sun gear shaft can abut against the distance ring to share part of the axial force, reduce wear between the sun gear shaft and the spline shaft, avoid the failure of the gear box, and extend the service life of the gear box.

Figure 1:
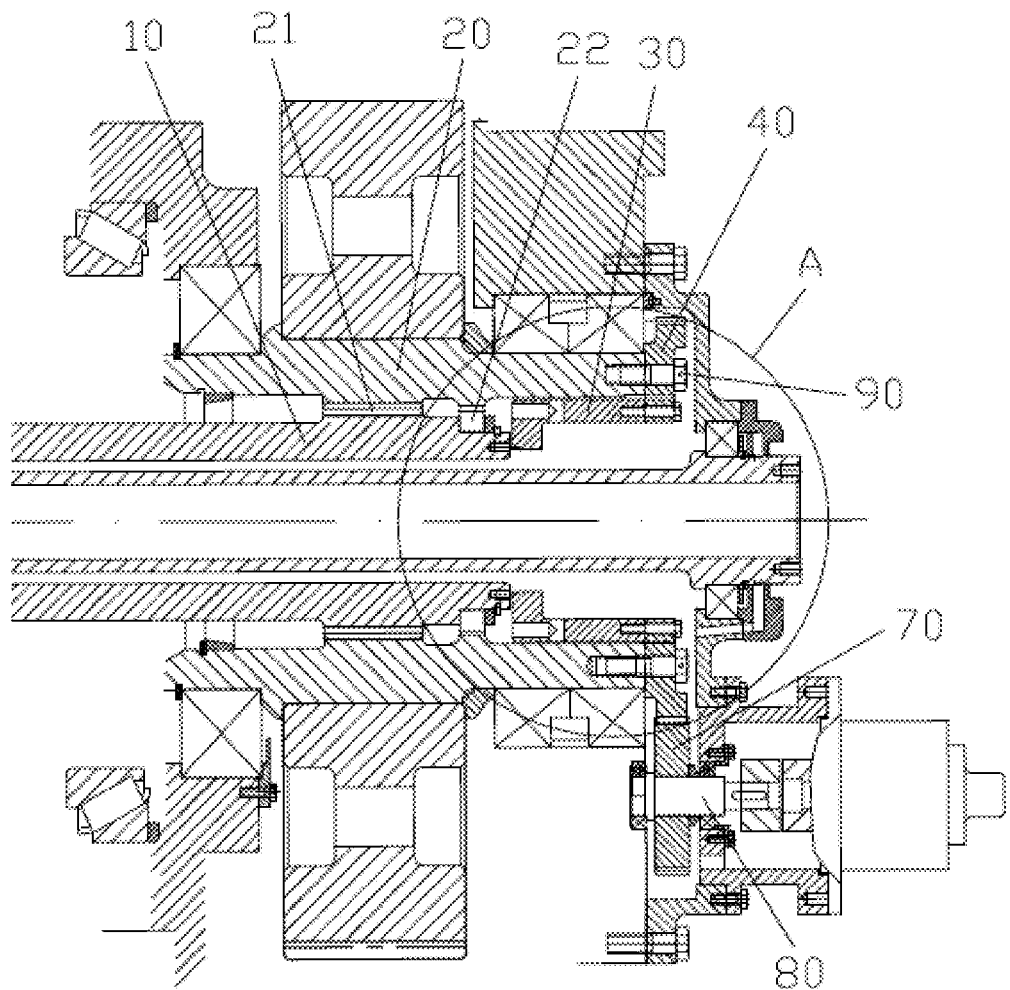
FIG. 1 is a perspective view of an assembly structure of sun gear shaft and spline shaft of a gearbox for wind turbine according to the present disclosure.

REFERENCE LIST 10 sun gear shaft
20 spline shaft
30 distance ring
40 mechanical pump drive gear
50 first bolt
60 tube shaft
70 first gear
80 output shaft
90 second bolt
11 step surface
21 spline pair
22 shoulder
221 second oil drain hole
31 distance ring side wall
32 distance ring bottom
311 first bolt hole
41 second bolt hole
42 first oil drain hole

DETAILED DESCRIPTION

The present disclosure will be further described in detail below with reference to the drawings and embodiments. It can be understood that the specific embodiments described here are only used to explain the present disclosure and not to limit the present disclosure. In addition, it should be noted that for ease of description, the drawings show only part of the structure related to the present disclosure, not all of the structure.

In the description of the present disclosure, unless otherwise expressly specified and limited, terms "disposed" and "connected" should be construed in a broad sense, for example, may be securely connected, detachably connected or integrated, or may be mechanically connected or electrically connected, or may be directly connected or indirectly connected through an intermediate medium, or may be an internal communication between two elements or an interaction relationship between two elements. For those skilled in the art, specific meanings of the preceding terms in the present disclosure may be understood based on specific situations.

In the present disclosure, unless otherwise expressly specified and limited, when a first feature is described as "on" or "below" a second feature, the first feature and the second feature may be in direct contact or may be in contact via another feature between the two features instead of being in direct contact. Moreover, that the first feature is "on", "above" or "over" the second feature includes that the first feature is right above or obliquely above the second feature or just indicates that the horizontal level of the first feature is higher than the horizontal level of the second feature. That the first feature is "under", "below" or "beneath" the second feature includes that the first feature is right below or obliquely below the second feature or just indicates that the horizontal level of the first feature is lower than the horizontal level of the second feature.

In the description of the present disclosure, orientations or position relations indicated by terms such as "upper", "lower", "right" are orientations or position relations based on the drawings. These orientations or position relations are intended only to facilitate the description of the present disclosure and simplify the description and not to indicate or imply that a device or element referred to must have such specific orientations or must be configured or operated in such specific orientations. Thus, these orientations or position relations are not to be construed as limiting the present disclosure. In addition, terms such as "first" and "second" are only for distinguishing description and not to be construed as indicating or implying relative importance.

The technical solutions of the present disclosure will be further described below in conjunction with the drawings and embodiment.

The present disclosure provides an assembly structure of sun gear shaft and spline shaft of a gearbox for wind turbine. FIG. 1 is a perspective view of the assembly structure of sun gear shaft and spline shaft of a gearbox for wind turbine according to the present disclosure. As shown in FIG. 1, the assembly structure includes a sun gear shaft 10, a spline shaft 20, a mechanical pump drive gear 40 and a distance ring 30.

The spline shaft 20 is a hollow shaft. One end of the sun gear shaft 10 is inserted into the spline shaft 20, and the end of the sun gear shaft 10 inserted into the spline shaft 20 is connected to the spline shaft 20 through a spline pair 21. The mechanical pump drive gear 40 is mounted at one end of the spline shaft 20. The mechanical pump drive gear 40 is securely connected to the spline shaft 20 and rotates synchronously under the drive of the spline shaft 20. The gearbox mechanical pump is driven by the mechanical pump drive gear. The gearbox mechanical pump is a type of gearbox oil pump. The inner diameter of the mechanical pump drive gear 40 is less than the inner diameter of the spline shaft 20 so that the inner ring of the mechanical pump drive gear 40 can protrude from the inner wall of the spline shaft 20, as shown in FIG. 1, to facilitate the utilization of the protrusion in positioning and installation of the distance ring 30.

In the present gearbox, there is also a structure in which a mechanical pump drive gear 40 is mounted at one end of the spline shaft 20, but there is not a distance ring 30 in the present structure, so the inner diameter of the mechanical pump drive gear 40 in the present structure is of the same size as the inner diameter of the spline shaft 20. In the present disclosure, the positioning and installation of the distance ring 30 can be performed simply in the case where the size of the inner diameter of the mechanical pump drive gear 40 is less, and the distance ring 30 is disposed to share the axial force of the sun gear shaft 10 and reduce wear between the sun gear shaft 10 and the spline shaft 20.

As shown in FIG. 1, the distance ring 30 is disposed in the spline shaft 20, and one end of the distance ring 30 abuts against the inner side of the mechanical pump drive gear 40 and is securely connected to the mechanical pump drive gear 40. Another end of the distance ring 30 is spaced from the end of the sun gear shaft 10 in the spline shaft 20. When wear occurs between the sun gear shaft 10 and the spline shaft 20, causing the sun gear shaft 10 to move axially to the right, the space between the distance ring 30 and the sun gear shaft 10 disappears, and the sun gear shaft 10 abuts against the distance ring 30 so that the distance ring 30 is against the sun gear shaft 10 to share the axial force of the sun gear shaft 10 and avoid a failure in the gear box.

Figure 2:
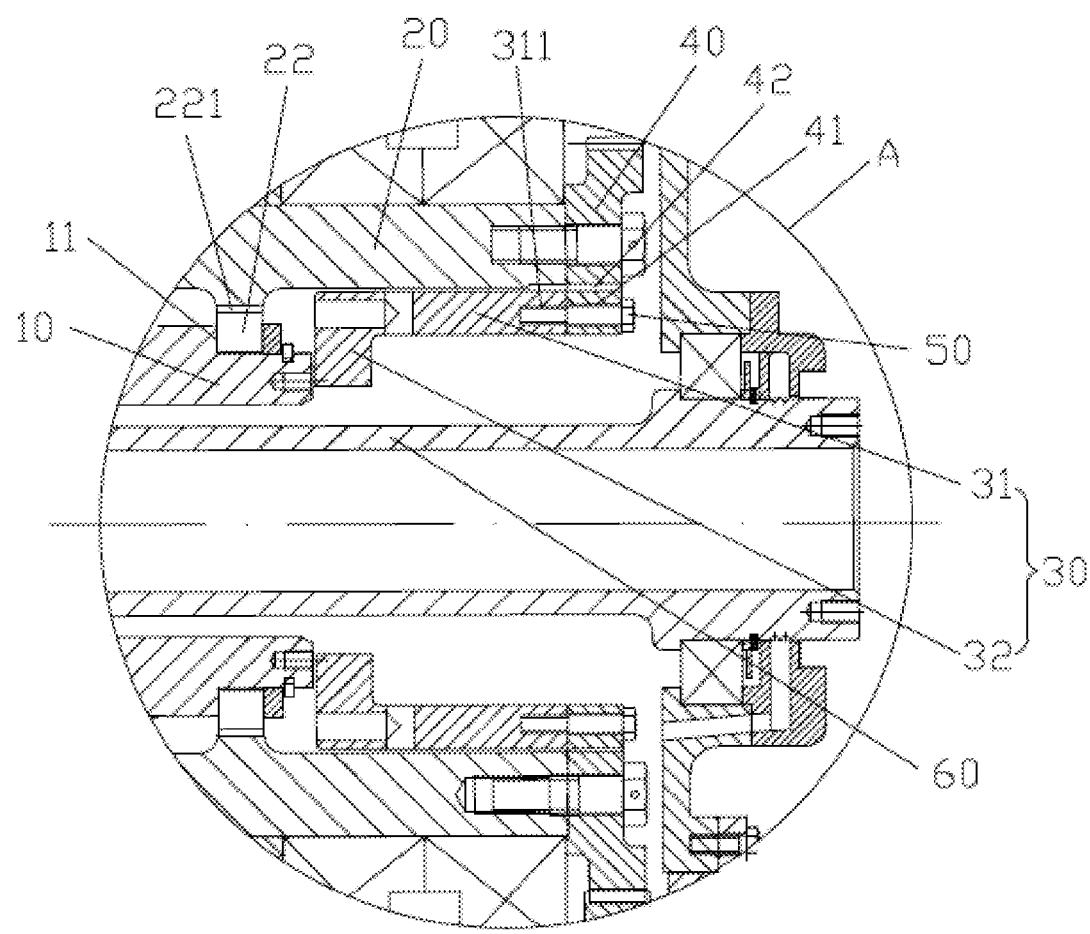
FIG. 2 is an enlarged view of part A of FIG. 1 of the present disclosure.

Further, as shown in FIG. 2, to facilitate the connection of the distance ring 30 and the mechanical pump drive gear 40 and to make it easier for the sun gear shaft 10 to abut against the distance ring 30, the distance ring 30 may include a distance ring side wall 31 and a distance ring bottom 32. The distance ring side wall 31 is parallel to the spline shaft 20. The distance ring bottom 32 is perpendicular to the spline shaft 20. The right end of the distance ring side wall 31 abuts against the inner side of the mechanical pump drive gear 40 and is securely connected to the mechanical pump drive gear 40. The distance ring bottom 32 is spaced from the end of the sun gear shaft 10 in the spline shaft 20.

Furthermore, as shown in FIG. 2, a plurality of first bolt holes 311 is disposed on the end of the distance ring side wall 31 connected to the mechanical pump drive gear 40. The first bolt holes 311 are disposed along the axial direction of the distance ring 30, and the mechanical pump drive gear 40 is provided with a plurality of second bolt holes 41 corresponding to the first bolt holes 311. A plurality of first bolts 50 is inserted into the second bolt holes 41 and the first bolt holes 311 so that the distance ring 30 can be secured to the mechanical pump drive gear 40.

With continued reference to FIG. 2, in one embodiment, a gap is disposed between the outer surface of the distance ring 30 and the inner wall of the spline shaft 20 to provide a space for the flow of lubricating oil. The mechanical pump drive gear 40 is provided with a first oil drain hole 42 at a position corresponding to the gap so that the lubricating oil flowing to the gap between the distance ring 30 and the spline shaft 20 flows out from the first oil drain hole 42.

There may be several first oil drain holes 42 and they are evenly distributed in the circumferential direction of the mechanical pump drive gear 40 to improve the oil discharge effect.

Further, a shoulder 22 is disposed in the spline shaft 20, a step surface 11 matched with the shoulder 22 is disposed on the sun gear shaft 10, and the shoulder 22 abuts against the step surface 11 to make the sun gear shaft 10 axially positioned. When the axial force of the sun gear shaft 10 causes wear at the joint of the step surface 11 and the shoulder 22, the axial deviation of the sun gear shaft 10 occurs, and the gap between the sun gear shaft 10 and the distance ring 30 is eliminated, and the surface of the right end of the sun gear shaft 10 and the distance ring 30 can fit and be positioned naturally in a manner in which the load is most uniformly distributed. At this time, the shoulder 22 of the spline shaft 20 and the distance ring 30 can bear the axial force of the sun gear shaft 10 jointly without mutual influence. The pressure on the two positioning surfaces contacting the sun gear shaft 10 is shared, thereby greatly reducing the rate of axial wear.

Furthermore, referring to FIGS. 1 and 2, the shoulder 22 is located between the spline pair 21 and the distance ring 30, a second oil drain hole 221 may be disposed on the shoulder 22, and the second oil drain hole 221 is disposed along the axial direction of the spline shaft 20 so that the lubricating oil at the front end of can flow out from the second oil drain hole 221.

As shown in FIG. 2, the assembly structure further includes a tube shaft 60. The sun gear shaft 10 is a hollow shaft. The tube shaft 60 is inserted into the shaft hole of the sun gear shaft 10 so that the sun gear shaft 10 is sleeved outside the tube shaft 60. The tube shaft is used for the assembly and support of some parts in the gearbox for wind turbine.

Further, as shown in FIG. 2, the inner diameter of the distance ring 30 is greater than the outer diameter of the tube shaft 60. In this manner, the distance ring 30 can be freely inserted into the tube shaft 60, and the installation of the distance ring 30 is not affected by the tube shaft 60 so that the installation of the distance ring 30 is convenient.

In one embodiment, as shown in FIG. 1, the assembly structure further includes a first gear 70, an output shaft 80 and a mechanical pump. The first gear 70 is meshed with the mechanical pump drive gear 40. One end of the output shaft 80 is connected to the first gear 70. Another end of the output shaft 80 is connected to the mechanical pump. In this manner, the torque of the mechanical pump drive gear 40 can be transmitted to the first gear 70, and then the first gear 70 transmits the torque to the output shaft 80. The output shaft 80 then transmits the torque to the mechanical pump to drive the mechanical pump to work.

In one embodiment, as shown in FIG. 1, the assembly structure further includes a second bolt 90. The mechanical pump drive gear 40 is mounted on the spline shaft 20 through the second bolt 90. The second bolt 90 is disposed along the axial direction of the mechanical pump drive gear 40. The mechanical pump drive gear 40 is mounted on the right end of the spline shaft 20.

Apparently, the above-mentioned embodiments of the present disclosure are merely illustrative of the present disclosure and are not intended to limit the embodiments of the present disclosure. Those skilled in the art can make various apparent changes, adaptations and substitutions without departing from the scope of the present disclosure. Embodiments of the present disclosure cannot be and do not need to be all enumerated herein. Any modifications, equivalent substitutions and improvements made within the spirit and principle of the present disclosure fall within the scope of the claims of the present disclosure.

What is claimed is:

1. An assembly structure of a sun gear shaft and a spline shaft of a gearbox for a wind turbine, comprising:
   the sun gear shaft;
   the spline shaft, wherein the spline shaft is a hollow shaft, one end of the sun gear shaft is inserted into the spline shaft, and the one end of the sun gear shaft inserted into the spline shaft is connected to the spline shaft through a spline pair;
   a mechanical pump drive gear, wherein the mechanical pump drive gear is mounted at one end of the spline shaft, and an inner diameter of the mechanical pump drive gear is less than an inner diameter of the spline shaft; and
   a distance ring, wherein the distance ring is disposed in the spline shaft, one end of the distance ring abuts against an inner side of the mechanical pump drive gear and is securely connected to the mechanical pump drive gear, and another end of the distance ring is spaced from the one end of the sun gear shaft in the spline shaft;
   wherein the distance ring includes a distance ring side wall parallel to the spline shaft and a distance ring bottom perpendicular to the spline shaft; the distance ring side wall abuts against the inner side of the mechanical pump drive gear and is securely connected to the mechanical pump drive gear; and the distance ring bottom is spaced from the one end of the sun gear shaft in the spline shaft;
   wherein a first bolt hole is disposed at an end of the distance ring side wall connected to the mechanical pump drive gear, the first bolt hole is disposed along an axial direction of the distance ring, the mechanical pump drive gear is provided with a second bolt hole corresponding to the first bolt hole, and a first bolt is inserted into the second bolt hole and the first bolt hole so that the distance ring is secured to the mechanical pump drive gear.

2. The assembly structure according to claim 1, wherein a gap is disposed between an outer surface of the distance ring and an inner wall of the spline shaft, and the mechanical pump drive gear is provided with a first oil drain hole that is disposed at a position corresponding to the gap.

3. The assembly structure according to claim 1, wherein a shoulder is disposed in the spline shaft, the sun gear shaft is provided with a step surface matched with the shoulder, and the shoulder abuts against the step surface so that the sun gear shaft is axially positioned.

4. The assembly structure according to claim 3, wherein the shoulder is located between the spline pair and the distance ring, a second oil drain hole is disposed on the shoulder, and the second oil drain hole is disposed along an axial direction of the spline shaft.

5. The assembly structure according to claim 1, further comprising a tube shaft, wherein the sun gear shaft is a hollow shaft, and the tube shaft is inserted into a shaft hole of the sun gear shaft.

6. The assembly structure according to claim 5, wherein an inner diameter of the distance ring is greater than an outer diameter of the tube shaft.

7. The assembly structure according to claim 1, further comprising a first gear, an output shaft and a mechanical pump, wherein the first gear is meshed with the mechanical pump drive gear, one end of the output shaft is connected to the first gear, and another end of the output shaft is connected to the mechanical pump.

8. The assembly structure according to claim 1, further comprising a second bolt, wherein the mechanical pump drive gear is mounted on the spline shaft through the second bolt.

* * * * *